C. WHEAT & A. CATCHPOLE.
COKE WAGON.

No. 98,001.　　　　　　　　　　Patented Dec. 14, 1869.

Witnesses.　　　　　　　　　　Inventors:

United States Patent Office.

CORYDON WHEAT, AND ALFRED CATCHPOLE, OF GENEVA, NEW YORK.

Letters Patent No. 98,001, dated December 14, 1869.

IMPROVED COKE-WAGON.

The Schedule referred to in these Letters Patent and making part of the same.

*To all whom it may concern:*

Be it known that we, CORYDON WHEAT and ALFRED CATCHPOLE, of Geneva, in the county of Ontario, and State of New York, have invented certain new and useful Improvements in Coke-Wagons for gas-works; and we do hereby declare that the following is a full, clear, and exact description thereof, reference being had to the accompanying drawings, making part of this specification, in which—

The object of our invention is to provide a vertically-adjustable and dumping conveyer for hot coke in gas-works; and to enable others to make and use the same, we will describe its construction and operation.

Figure 1:
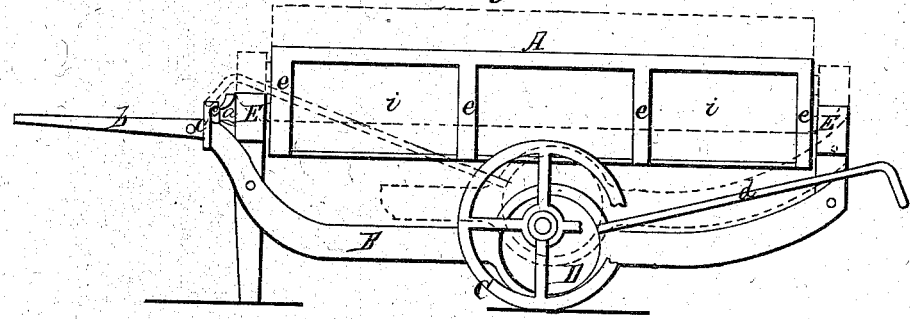
Figure 1 is a side elevation of our invention, the red lines indicating the position of the parts when elevated by the eccentries D.
Figure 2:
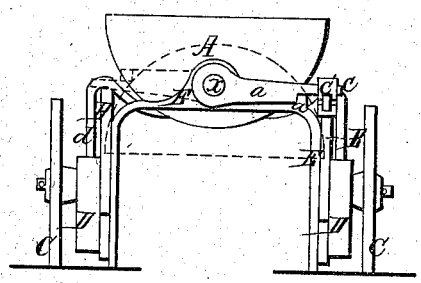
Figure 2 is an end elevation of our invention.

We construct the frame of our coke-wagon with side-bars B, figs. 1 and 2, extending, as seen in fig. 1, to form handles b for moving the wagon, which bars are connected by cross-bars E E', carrying bearings for the trunnions of the dumping-box A.

Each end of the bar E extends downward far enough to form legs for the rear of the wagon to rest upon.

The box A is composed of a frame, e, made in a semi-cylindrical form, upon the inside of which the lining i is riveted or otherwise secured.

The object of this arrangement is to permit the lining to be easily removed when burned or worn out.

The heads or ends of the box are secured to the frame in any convenient manner, and upon them, considerably below the centre, we provide the trunnions x, resting in bearings upon the cross-bars E E'.

Upon the rear trunnion we secure the arm a, having a handle, a', projecting out at right angles to it, for the purpose of dumping the box.

The spur c is a continuation of the arm a, and rests upon the bar B, when the box is in an upright position, and to prevent accidental tipping of the latter, we provide upon the handle b the catch c', hooking over the spur, and retaining it and the box in place.

At the centre, longitudinally of the bars B, we locate the eccentrics D, revolving in journals prepared for them in the bars.

The carrying-wheels C hang upon axles secured to these eccentrics, at points sufficiently distant from the centre to obtain the requisite vertical adjustment of the wagon, said eccentrics being operated by the bail d, secured to each, and extending around the end of the wagon, as shown.

Figure 3:
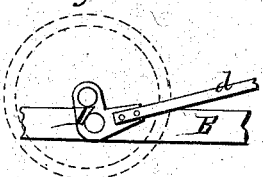
Figure 3 shows a substitute for the elevating-eccentric.

In fig. 3, we have shown a substitute for the eccentric D, consisting of a bell-crank rocking upon a centre, secured to the side-bar B, the carrying-wheel being at the outer end of one arm.

The operation is similar to that of the eccentric.

We may work the eccentrics by means of a chain and pulley, the latter controlled by a crank located within reach of the operator.

In gas-works, the coking-retorts are arranged in sets or benches of three or five, the latter number being always situated lower in the arch.

Our invention is specially adapted to receive coke from either of the above arrangements.

Its operation is as follows:

When emptying benches of five retorts, or more, the bail d is thrown over to the front of the box, as shown in full lines in fig. 1, partly revolving the eccentrics, and lowering the frame and box, (which latter is made long enough to receive coke from all or any number of the retorts,) so that the wagon may be readily run under the mouths of the retorts.

After filling the box, the bail is turned to the rear, elevating the eccentrics, frame, and box, to the position shown in red lines in fig. 1, when the load may be moved off.

To empty the box, the catch c' is moved back to the position shown in dotted lines, fig. 1, by the operator, and by means of the handle a' and arm, a, the box is given a semi-revolution, discharging its contents.

By the peculiar arrangement of the frame and eccentrics, we dispense with the cross-axle usual in such wagons, and the load is discharged from a considerable height, allowing it to pile up, without interfering with the movement of the wagon.

In the coke-wagons in ordinary use, having detachable or swinging ends for dumping, it is impossible to make joints so tight but that a sufficient draught will be created through the coke to increase its combustion and consequent heat.

It will be seen that the bottom of the box A is nearly air-tight, which prevents the admission of oxygen to the coke, and checks the increase of temperature therein.

What we claim as our invention, and desire to secure by Letters Patent, is—

1. The dumping-box A, swung upon trunnions, substantially as described, and composed of frame e, and lining, i, for the purposes specified.

2. In combination with the dumping-box A, and its suspending-frame, the cranked bail d, and carrying-wheel, C, substantially as and for the purposes set forth.

CORYDON WHEAT.
ALFRED CATCHPOLE.

Witnesses:
FRED. W. PRINCE,
JOHN WRIDE.